United States Patent [19]
McMahon

[11] Patent Number: 6,061,990
[45] Date of Patent: May 16, 2000

[54] CONDUIT POSITIONING DEVICE FOR SLABS

[75] Inventor: Michael John McMahon, Nunderi, Australia

[73] Assignee: Zardoz Pty Ltd., New South Wales, Australia

[21] Appl. No.: 09/066,298

[22] PCT Filed: Nov. 1, 1996

[86] PCT No.: PCT/AU96/00694

§ 371 Date: May 1, 1998

§ 102(e) Date: May 1, 1998

[87] PCT Pub. No.: WO97/17516

PCT Pub. Date: May 15, 1997

[30] Foreign Application Priority Data

Nov. 3, 1995 [AU] Australia ................... PN6334

[51] Int. Cl.⁷ ..................................................... E04C 5/16
[52] U.S. Cl. ................. 52/677; 52/699; 52/298; 52/169.5; 52/220.8; 285/150.1; 285/221; 285/219; 248/523
[58] Field of Search ............................. 52/677, 699, 298, 52/309.12, 220.8, 169.5; 248/539, 534, 523, 519; 403/298, 292; 256/19, 24; 285/150.1, 219, 221

[56] References Cited

U.S. PATENT DOCUMENTS

| 1,811,735 | 6/1931 | Van Bezel | 277/526 |
|---|---|---|---|
| 3,267,627 | 8/1966 | Hammitt | 52/298 |
| 3,292,335 | 12/1966 | Stober | 52/677 |
| 4,593,940 | 6/1986 | Wilder | 285/142.1 |
| 4,623,170 | 11/1986 | Cornwall | 285/4 |
| 4,669,759 | 6/1987 | Harbeke | 285/136.1 |
| 5,309,688 | 5/1994 | Robertson | 52/220.8 |
| 5,560,163 | 10/1996 | Carlton | 52/169.5 |
| 5,595,039 | 1/1997 | Lowery | 52/677 |
| 5,794,395 | 8/1998 | Reed | 52/298 |
| 5,836,130 | 11/1998 | Unruh et al. | 52/698 |

OTHER PUBLICATIONS

International Search Report, International Application No. PCT/AU96/00694, International Filing Date Nov. 1, 1996.

Primary Examiner—Carl D. Friedman
Assistant Examiner—Jennifer I. Thissell
Attorney, Agent, or Firm—Leydig, Voit & Mayer, Ltd.

[57] ABSTRACT

A conduit positioning or locating device adapted to be secured to formwork defining one side of a slab of concrete or other settable material for positioning a conduit for passage through the slab. The device includes a body, having at least one opening on its top side for receipt of a conduit. The body has means, such as a spigot and socket, on at least one side adapted for cooperative engagement with a further device whereby to enable a plurality of the devices to be located in a complementary mating configuration.

11 Claims, 4 Drawing Sheets

CONDUIT POSITIONING DEVICE FOR SLABS

TECHNICAL FIELD

This invention relates to a conduit positioning or locating devices which are particularly designed for use in positioning conduits for passage through concrete slabs, for example concrete slab walls or floors.

BACKGROUND ART

There is currently known a conduit positioning device which is arranged to position conduits carrying electrical cables for passage through concrete slabs. Such a device comprises a member which has a generally frustoconical side wall an annular flange about the larger diameter end of the device and an end wall opposite the annular flange which includes a socket for receipt of the conduit. In use, the device is secured to formwork by means of clouts which are passed through the annular flange which for that purpose is provided with a series of spaced apart apertures. The conduit is then inserted into the socket and when the concrete is poured, it encapsulates the device and conduit. After the concrete has cured and the formwork is removed, the device is pulled away from the cured slab, either with the formwork or separately leaving a void in which the end of the conduit terminates. The end of the conduit may then be connected to a further conduit or conduit fitting in the void.

The main disadvantage of his form of device is that because of its configuration, being circular in cross-section, a series of devices cannot be located any closer than a position where flanges of adjacent devices abut each other. This therefore means that the area required for the passage of conduits through the slab is substantial, particularly where a large number of conduits are required to be passed through a slab. In addition, some difficulty is often encountered in removing the device from the slab.

The present invention aims to overcome or alleviate one or more of the above disadvantages by providing an improved conduit positioning or locating device which permits conduits which are required to be passed through a slab to be located relatively closely to each other and therefore reduce the area of the slab required for passage of conduits.

The present invention firer aims to provide a device in modular form which may be associated with one or more other such positioning devices to locate a plurality of conduits. Other objects and advantages of the invention will become apparent from the following description

DISCLOSURE OF THE INVENTION

The present invention thus provides in one aspect, a conduit positioning or locating device adapted to be secured to formwork defining one side of a slab of concrete or other settable material for positioning a conduit for passage through said slab, said device including a body, having a socket or opening on its top side for receipt of a conduit, said body having means on at least one side adapted for co-operative engagement with a further said device whereby to enable a pair of said devices to be located in a complementary mating configuration In one form, the body includes on opposites sides complementary coupling means adapted for engagement with corresponding complementary coupling means of an adjacent device whereby a series of devices may be interconnected. The complementary coupling means may in one form comprise a spigot and socket. In one particularly preferred form, each side of the body may be provided with a spigot and socket which oppose each other on opposite sides of the device. The opposite sides of the body may be substantially planar such that when the devices are in their complementary mating configuration, the planar sides thereof are juxtaposed.

The body may also include flange means which enable the body to be secured to formwork. The flange means may comprise flanges on opposite ends of the device. The flanges may be apertured to receive fasteners therethrough, such as clouts whereby the devices may be releasably secured to formwork.

The sockets in respective bodies may be of different sizes for receipt of conduit of different diameter. In addition, in one form the body may include a plurality of sockets to enable a plurality of conduits to be positioned in a slab by the single body.

End devices may also be provided the end devices having the complementary coupling means on one side only. The other or outer side of the end device may be of any configuration, such as curved or square. Peripheral securing flanges may be located about the outer sides of the end devices to enable the end devices to be secured to the formwork. The devices are suitably formed of plastics material, for example by a moulding process.

BEST MODE FOR CARRYING OUT THE INVENTION

In order that the invention may be more readily understood and put into practical effect, reference will now be made to the accompanying drawings which illustrate embodiment of the invention and wherein.

Figure 1:
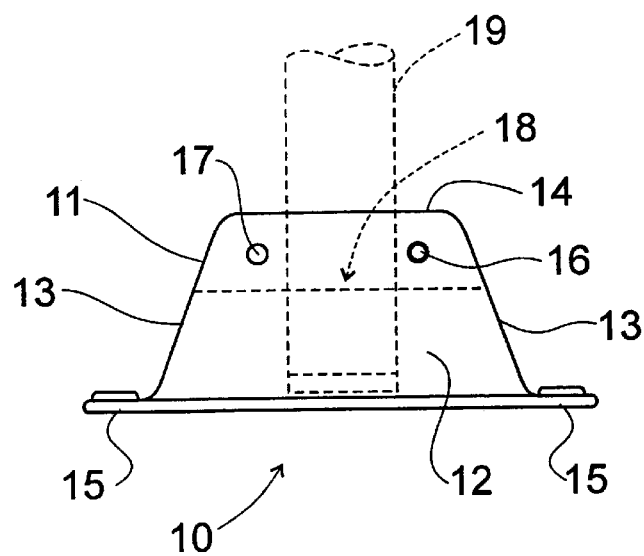
FIG. 1 is an end view of a positioning device according to the present invention.
Figure 2:
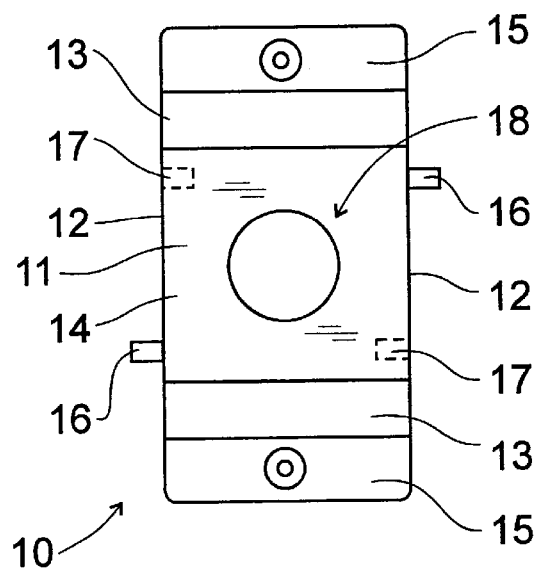
FIG. 2 is a plan view of the device of FIG. 1.
Figure 3:
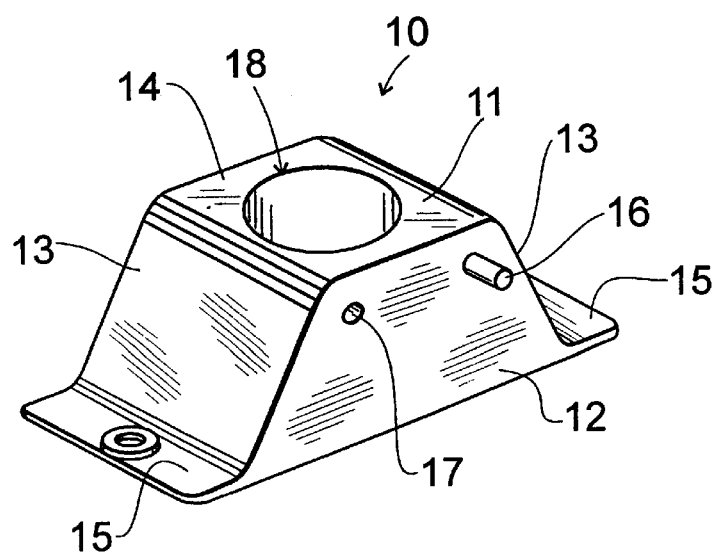
FIG. 3 is a perspective view of the device of FIG. 1.

Referring to the drawings and firstly to FIGS. 1 to 3 and 9 there is illustrated a conduit positioning device 10 accordingly to the present invention comprising a body 11 which has opposite substantially planar upright side walls 12 and which include opposite end walls 13 which are inclined downwardly from a top wall 14. End flanges 15 extend from the lower side of the end walls 13 to enable the device 10 to be secured to formwork which defines one side of a slab of concrete to be formed. Each planar side wall 12 includes an outwardly projecting spigot or pin 16 ad an inwardly directly socket or bore 17 complementary to the pin or spigot 16.

The top wall 14 of the body 11 is provided with a socket 18 for receiving a conduit 19 show in dotted outlined in FIG. 1.

Figure 4:
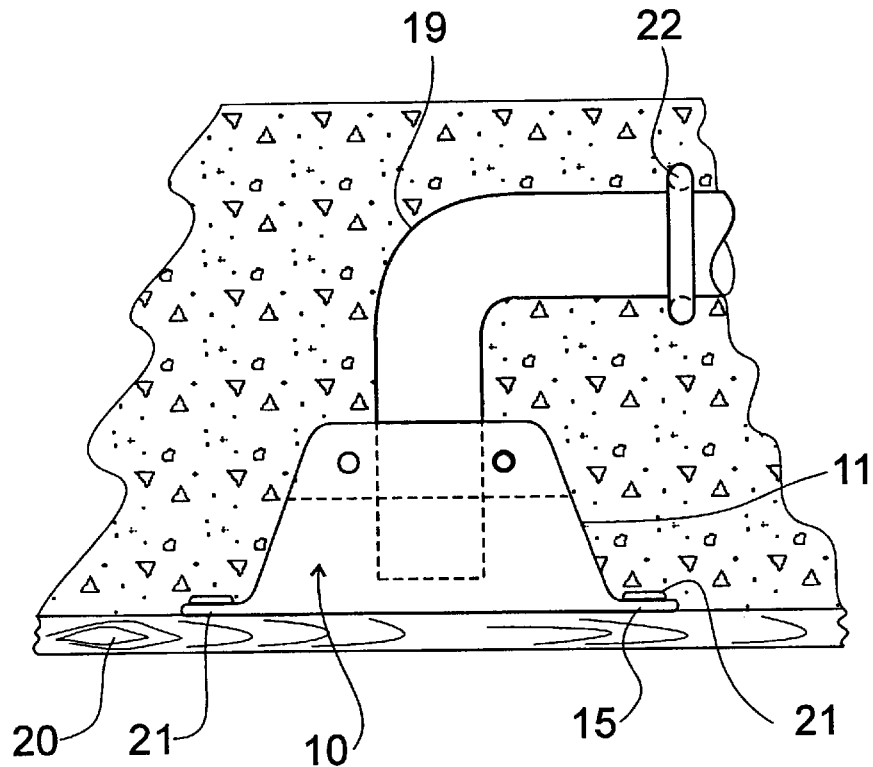
FIG. 4 and 5 illustrate the manner of use of the device of the invention.
Figure 5:
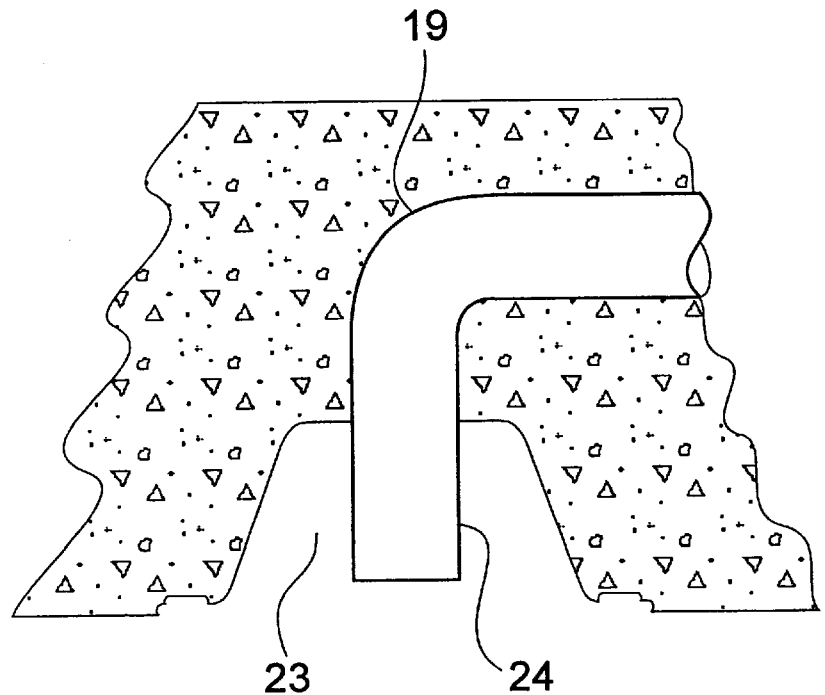

In use, and as shown in FIG. 4, the body 11 is secured to formwork 20 defining one side of a slab to be formed by clouts 21 at a position where the conduit 19 is required to be passed through the slab. A conduit 19 is then inserted into the socket 18 and may be retained by tying to steel reinforcement 22. The concrete is then poured about the device 10 and conduit 19 onto the formwork 20 to encapsulate the device 10. After the concrete has cured, the formwork 20 is detached and the device 10 is removed either with the formwork 20 or separately leaving a void 23 about the end 24 of the conduit 19 for connection to a further conduit or coupling (see FIG. 5).

Figure 6:
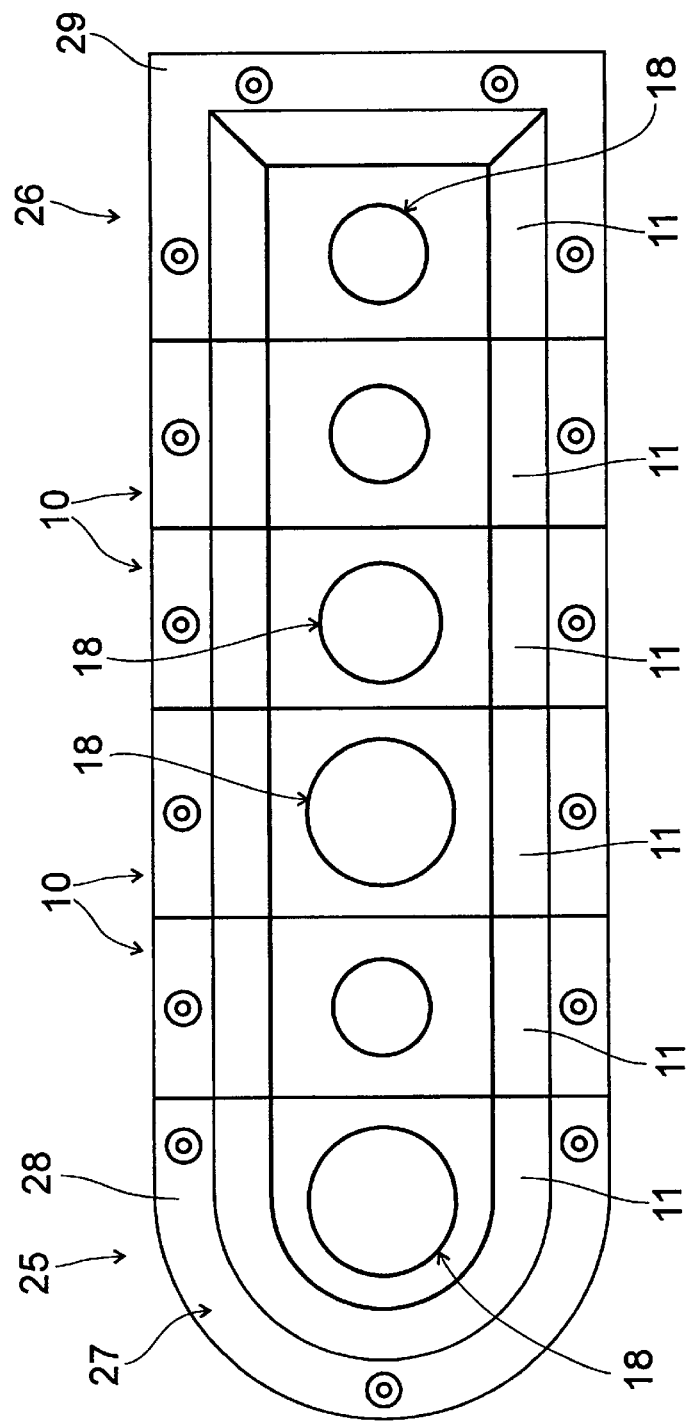
FIG. 6 is a plan view showing a series of devices interconnected.
Figure 7:
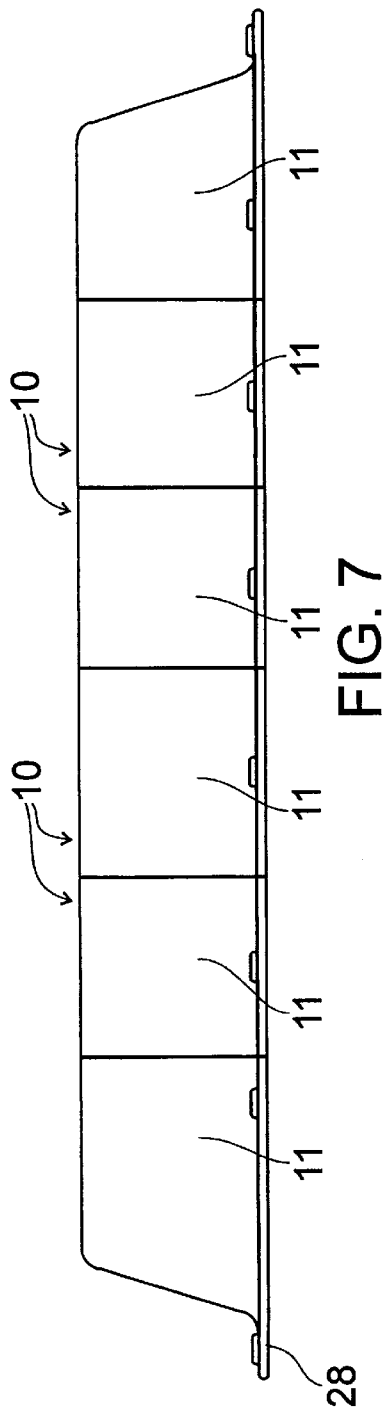
FIG. 7 is a side view of the assembly of FIG. 6.

The configuration of the device 10 pets a plurality of devices 10 to be coupled in a side by side relationship as shown in FIGS. 6 and 7 with the respective devices 10 being aligned and joined through engagement of the complementary spigots 16 and sockets 17.

In the devices 10 illustrated in FIG. 6, the sockets 18 of respective devices 10 are shown to be of different sizes. It will be apparent, however, that the sockets 18 may be of all the same size. The arrangement described and shown positions the sockets 18 of the respective devices 10 closely to each other which decreases the area needed to bring conduits, say into switchboards and panels. At each end of the assembly of devices 10 in FIGS. 6 and 7, end units 25 and 26 may be provided. Each end unit 25 and 26 has only one planar wall which is juxtaposed with a planar wall of a device 10. The planar wall of the devices 25 and 26, however, has complementary coupling means of the same form as the devices of FIG. 10, such as to enable them to be coupled to the devices 10.

The end device 25, however, has an outer curved wall 27 and curved flange 28 for enabling the device 25 to be secured to formwork. The opposite end device 26 is of substantially rectangular form incorporating a perimeter flange 29 for attachment to formwork. The end devices 25 and 26 incorporate sockets 18 as with the devices 10. The sockets 18 may be of any diameter.

Figure 8:
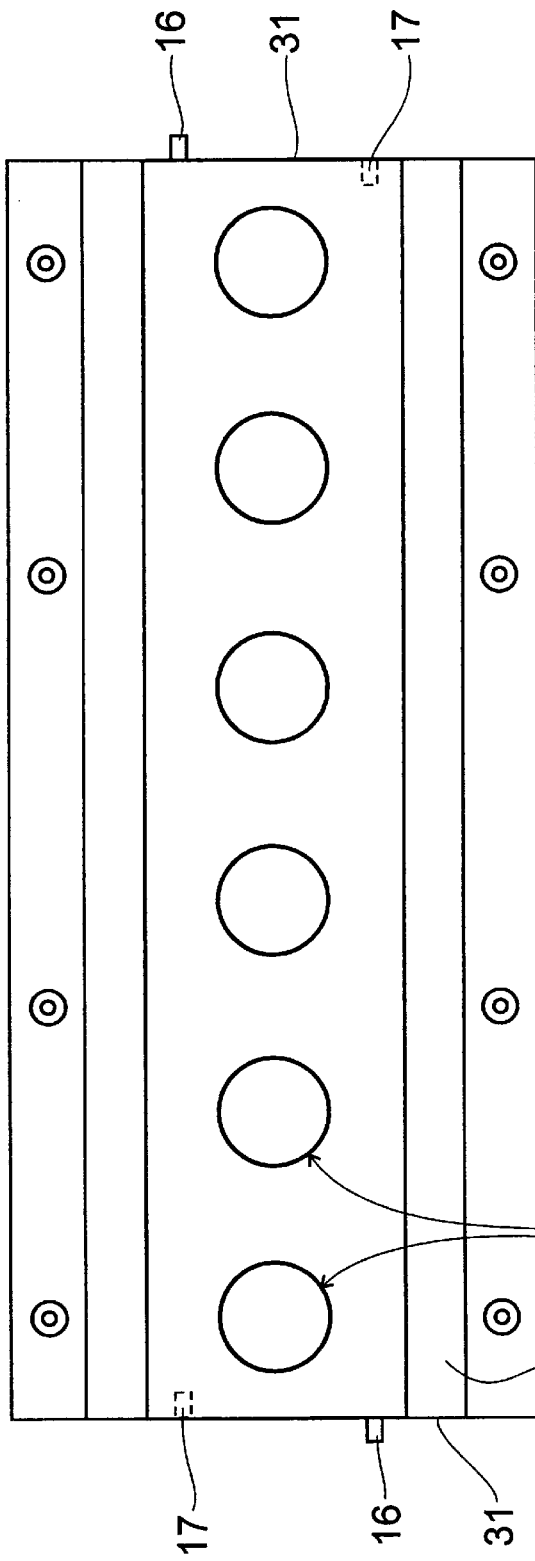
FIG. 8 is a plan view of a positioning device provided with multiple positioning sockets.

Referring now to FIG. 8 there is illustrated a positioning device 30 which in this instance is provided with a plurality of sockets 18 and which has opposite end walls 31 which incorporate connecting spigots 16 and sockets 17 of the same form as the device 10. The device 30 eliminates the need to join a series of separate devices 10.

The positioning devices of the invention may be used in any application where conduits are required to be positioned in concrete slabs, for example for location above switchboards or walls for drops to switches, power points, telephone outlets or other similar fittings or passing through from one concrete slab to another. The devices 10 substantially reduce the area occupied by the conduits and to enable easy removal from the concrete slab after curing thereof, formwork oil may be applied to the devices prior to pouring of concrete.

The devices are also reusable as if pulled free from the slab with the formwork, they may be simply detached from the formwork by removing the hold-down clouts or screws. For easier removal, the devices may be placed on a thin sheet of foam plastics material or the like which sits on the formwork will reduce the possibility of concrete passing beneath the flanges. This will also facilitate easier removal of the devices from the poured slab.

Figure 9:
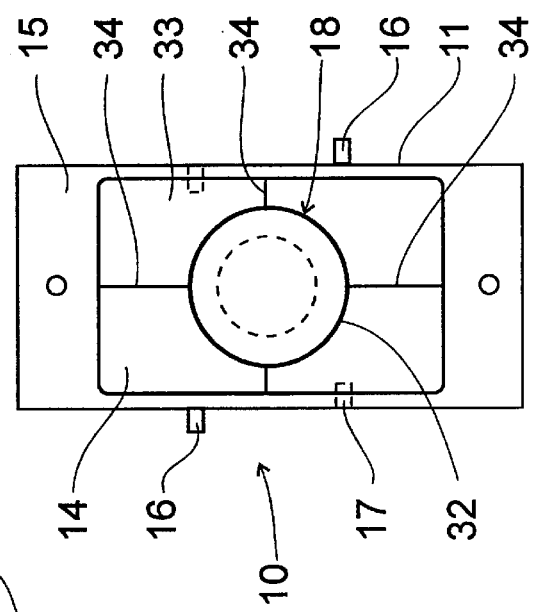
FIG. 9 is an underside view of the device of FIGS. 1 and 2.

The sockets 18, for receiving the conduits preferably are in the configuration of a blind bore which is defined by a generally tubular member 32 as shown in FIG. 9. The tubular member 32 extends into a hollow 33 in the underside of the device 10 below the top wall 14 and is supported by radially ending ribs 34. All components are preferably moulded integrally of plastics. It will be appreciated, however, that this configuration is only one configuration possible and the device 10 may have many other different configurations.

The spigot and sockets 16 and 17 for interconnecting the devices 10 have been shown to be of one particular form It will be appreciated, however, that the spigot and socket may be of many different forms which will enable complementary coupling between respective devices. The spigot and socket described, simply allow one device to be slid into engagement with another device. If desired, however, the spigot and socket may provide for a more positive engagement, for example a snap-in engagement of the spigot and socket This will more positively hold the devices together but will still permit removal of the devices.

The devices 10, as well as the end devices 25 and 26 are mirror reversible which therefore reduces the cost of manufacturing the devices in a moulding process. Of course, a pair of end devices 25 or 26 may be used together where only two conduits are required to pass through the slab.

Whilst the above has been given by way of illustrative embodiment of the invention, all such modifications and variations thereto as would be apparent to persons skilled in the art are deemed to fall within the broad scope and ambit of the invention as herein defined in the appended claims.

What is claimed is:

1. A conduit positioning element for a concrete slab, said element comprising:
    a body having a base portion, said body comprising:
        a conduit locating recess having an opening formed in a top portion of said body, said recess having a closed end opposite said opening; and
        at least one upright planer wall comprising a spigot projection spaced from a socket recess:
    and at least one mounting flange adjacent said base portion;
    said element being engagable with further said elements by coupling of respective said spigot projections with said socket recesses for compact alignment of two or more said conduit locating recesses adjacent a face of said concrete slab,
    said element being removable from a concrete slab after removal of slab framework to form a recess in a face of said slab with an exposed end of at least one conduit extending thereinto.

2. The element according to claim 1, wherein said body includes tapered walls on opposite sides thereof, said tapered walls tapering divergently towards said base portion.

3. The element according to claim 2, wherein a mounting flange extends from each tapered wall.

4. The element according to claim 1, wherein said body includes opposed upright planar walls each having a spigot projection spaced from a socket recess, said spigot projection on one upright planar wall being axially aligned with said socket recess on an opposite upright planar wall.

5. The element according to claim 2, further comprising a further tapered wall opposite said at least one upright planar wall, said further tapered wall tapering divergently towards said base portion.

6. The element according to claim 5, wherein said further tapered wall comprises a mounting flange adjacent said base portion.

7. The element according to claim 1, further comprising a plurality of conduit locating recesses.

8. A conduit positioning device for a concrete slab, said device comprising a plurality of coupled elements according to claim 1.

9. The conduit positioning device according to claim 8, wherein said conduit locating recesses of respective elements are of different sizes to accommodate conduits of differing diameter.

10. The conduit positioning device according to claim 8, wherein opposing endmost elements have a tapered end wall tapering divergently towards respective base portions thereof.

11. A conduit positioning element for a concrete slab comprising:

a) a base portion;

b) at least one mounting flange adjacent said base portion of said element;

c) a conduit locating recess having an open end and a closed end opposite said open end; and d) at least one upright planar wall;

said at least one upright planar wall including a spigot projection spaced from a socket recess, said element, in use, being engagable with a further like element by coupling of respective spigot projections with socket recesses for compact alignment of two or more conduit locating recesses adjacent a face of said concrete slab, wherein said element is removable from a formed concrete slab after removal of slab formwork to form a recess in a face of said slab.

* * * * *